US012005280B2

(12) United States Patent
Walker

(10) Patent No.: US 12,005,280 B2
(45) Date of Patent: Jun. 11, 2024

(54) FIRE DOOR SYSTEM FOR CONVEYOR

(71) Applicant: FORTYFIVE FABRICATION, LLC, Johnston, IA (US)

(72) Inventor: Kevin Walker, Johnston, IA (US)

(73) Assignee: FORTYFIVE FABRICATION, LLC, Johnston, IA (US)

(*) Notice: Subject to any disclaimer, the term of this patent is extended or adjusted under 35 U.S.C. 154(b) by 161 days.

(21) Appl. No.: 17/858,306

(22) Filed: Jul. 6, 2022

(65) Prior Publication Data
US 2023/0022879 A1 Jan. 26, 2023

Related U.S. Application Data

(60) Provisional application No. 63/222,208, filed on Jul. 15, 2021.

(51) Int. Cl.
A62C 2/22 (2006.01)
A62C 2/20 (2006.01)
A62C 2/24 (2006.01)
E05F 15/72 (2015.01)
B65G 15/00 (2006.01)

(52) U.S. Cl.
CPC ............ A62C 2/20 (2013.01); A62C 2/24 (2013.01); A62C 2/242 (2013.01); A62C 2/247 (2013.01); E05F 15/72 (2015.01); B65G 15/00 (2013.01); E05Y 2400/44 (2013.01); E05Y 2400/52 (2013.01); E05Y 2800/414 (2013.01); E05Y 2900/134 (2013.01)

(58) Field of Classification Search
CPC .... A62C 2/20; A62C 2/22; A62C 2/24; A62C 2/242; A62C 2/247; E05F 15/72; E05Y 2400/44; E05Y 2400/52; E05Y 2800/414; E05Y 2900/134

USPC .................................................. 198/804, 950
See application file for complete search history.

(56) References Cited

U.S. PATENT DOCUMENTS 4,108,195 A * 8/1978 Berry ..................... A62C 2/248
                                                      137/68.13
4,753,337 A * 6/1988 Grosjean .................. F27B 9/38
                                                      198/950

(Continued)

OTHER PUBLICATIONS

US 2022.0186554 A1, Choi et al., Jun. 16, 2022.*
US 2022/0364405 A1, Evans, Nov. 17, 2022.*

Primary Examiner — Douglas A Hess
(74) Attorney, Agent, or Firm — BrownWinick Law Firm; Jonathan B. Soike

(57) ABSTRACT

In one or more arrangements, a system is presented for preventing the spread of fire through a conveyor opening in a fire wall. In one or more arrangements, a fire door system is connected to the fire wall and/or conveyor proximate to the conveyor opening. The fire door system includes a door assembly, a door frame assembly, and an actuator. The door frame assembly is connected to the fire wall, covers portions of the opening below the conveyor and between belts of the conveyor, and forms a door opening above the conveyor. The door assembly is configured to move between a closed position, where door assembly covers the door opening, and an open position, where the door assembly at least partially uncovers the door opening. The actuator is configured to cause the door to be moved to the closed position in response to fire.

20 Claims, 17 Drawing Sheets

(56) References Cited

U.S. PATENT DOCUMENTS

| | | | | |
|---|---|---|---|---|
| 5,373,932 | A * | 12/1994 | Stobich | A62C 2/18 |
| | | | | 198/950 |
| 8,316,915 | B2 * | 11/2012 | Drifka | E05D 15/165 |
| | | | | 160/195 |
| 10,480,242 | B2 * | 11/2019 | Stehr | E05F 15/73 |
| 11,059,672 | B2 * | 7/2021 | Ogawa | B65H 7/06 |
| 11,305,947 | B1 * | 4/2022 | Singleton | B65G 21/00 |
| 11,376,453 | B2 * | 7/2022 | Takagawa | A62C 3/002 |

* cited by examiner

FIRE DOOR SYSTEM FOR CONVEYOR

CROSS REFERENCE TO RELATED APPLICATION

This application claims the benefit of U.S. Provisional Application No. 63/222,208 titled "FIRE DOOR SYSTEM FOR CONVEYOR" and filed on Jul. 15, 2021, the entire contents of which is hereby fully incorporated by reference herein.

FIELD OF THE DISCLOSURE

This disclosure relates to fire doors for conveyor systems. More specifically and without limitation, this disclosure relates to a fire door system for conveyors of poultry houses.

OVERVIEW OF THE DISCLOSURE

Poultry farming in the United States is increasingly conducted at larger and larger scales to reduce costs and maximize production. Typically, chickens are housed in large poultry houses to facilitate hatching, brooding, breeding, and/or egg production. When hens lay an egg in conventional caged or cage free production layer houses, the floor of the cage or nest box is sloped slightly to the font of the system, which causes the eggs to roll onto several small in-system egg belt-type conveyor. Once on the in-system egg conveyor, the eggs are moved to the front of the building where the individual in-system egg conveyor belts are combined onto one cross-collection belt-type conveyor via a mechanical devise know as an egg elevator. Once on the cross-collection conveyor, the eggs are moved to a centralized facility where they are further processed to meet the end user's needs. Typically, an egg production operation consists of several poultry houses that are connected by a hallway containing the cross-collection conveyor going to the centralized processing room.

Poultry houses are subject to extreme risk of fire due to the high flammability of feathers, the chickens themselves, dust, mechanical failures, electrical failures, and heating sources. Fire can spread through an entire poultry house in a matter of minutes. Worse yet, fires quickly spread from one poultry house to others, resulting in extreme losses. Investment costs for new poultry housing including site preparation, construction, equipment, wiring and plumbing often exceed $15,000,000 per house. For an operation having several poultry houses, building, equipment, and business interruption losses resulting from a fire are catastrophic.

In an effort to mitigate losses, many producers build concrete, concrete masonry unit, or other fire rated wall assemblies in the cross-collection hallways between adjacent poultry houses to mitigate the spread of fire from building-to-building. Unfortunately, the existence of the cross collection conveyor system (ranging from 18-60" wide) requires a large unprotected opening thru the fire walls allowing the fire to "jump" the fire wall and rapidly spread to adjacent buildings due to the extreme intensity of such fires.

There is a long felt but unsolved need for an improved system for preventing spread of fire between adjacent poultry houses. Therefore, for all the reasons stated above, and the reasons stated below, there is a need in the art for a fire door system that improves upon the state of the art.

Thus, it is an object of the disclosure to provide a fire door system configured to prevent the spread of fire through an opening for a conveyor in a fire wall.

Another object of the disclosure is to provide a fire door system that is compatible with a variety conveyor types.

Yet another object of the disclosure is to provide a fire door system that closes the fire door automatically when fire is present.

Another object of the disclosure is to provide a fire door system that monitors environmental conditions indicative of fire.

Yet another object of the disclosure is to provide a fire door system that is relatively inexpensive.

Another object of the disclosure is to provide a fire door system that has a long useful life.

Yet another object of the disclosure is to provide a fire door system that is durable.

Another object of the disclosure is to provide a fire door system that has a robust design.

Yet another object of the disclosure is to provide a fire door system that is high quality.

Yet another object of the disclosure is to provide a fire door system that is easy to use.

Another object of the disclosure is to provide a fire door system that is easy to control.

Yet another object of the disclosure is to provide a fire door system that is easy to install.

These and other objects, features, or advantages of the disclosure will become apparent from the specification, figures, and claims.

SUMMARY OF THE DISCLOSURE

In one or more arrangements, a system is presented for preventing the spread of fire through a conveyor opening in a fire wall. In one or more arrangements, the conveyor has a belt positioned on a set of rollers. The belt forms a continuous loop having an upper portion of the belt and a lower portion of the belt. The conveyor extends through a conveyer opening in a fire wall. The belt partitions the conveyor opening into an upper opening positioned above the upper portion of the belt, a middle opening positioned between the upper portion of the belt and the lower portion of the belt, and a lower opening positioned below the lower portion of the belt. A fire door system is connected to the fire wall and/or conveyor proximate to the opening. The fire door system includes a door assembly, a door frame assembly, and an actuator. The door frame assembly is connected to the fire wall, covers a lower opening, covers the middle opening, and forms a frame for the door assembly having a door opening within the upper opening of the fire wall. The door assembly is configured to move between a closed position and an open position. In the closed position, the door assembly covers the door opening. In the open position, the door assembly at least partially uncovers the door opening to permit transportation of eggs and/or other objects by the conveyor. The fire door system includes an actuator configured to cause the door to be moved from the open position to the closed position in response to occurrence of fire.

DETAILED DESCRIPTION OF THE DISCLOSURE

Figure 1:
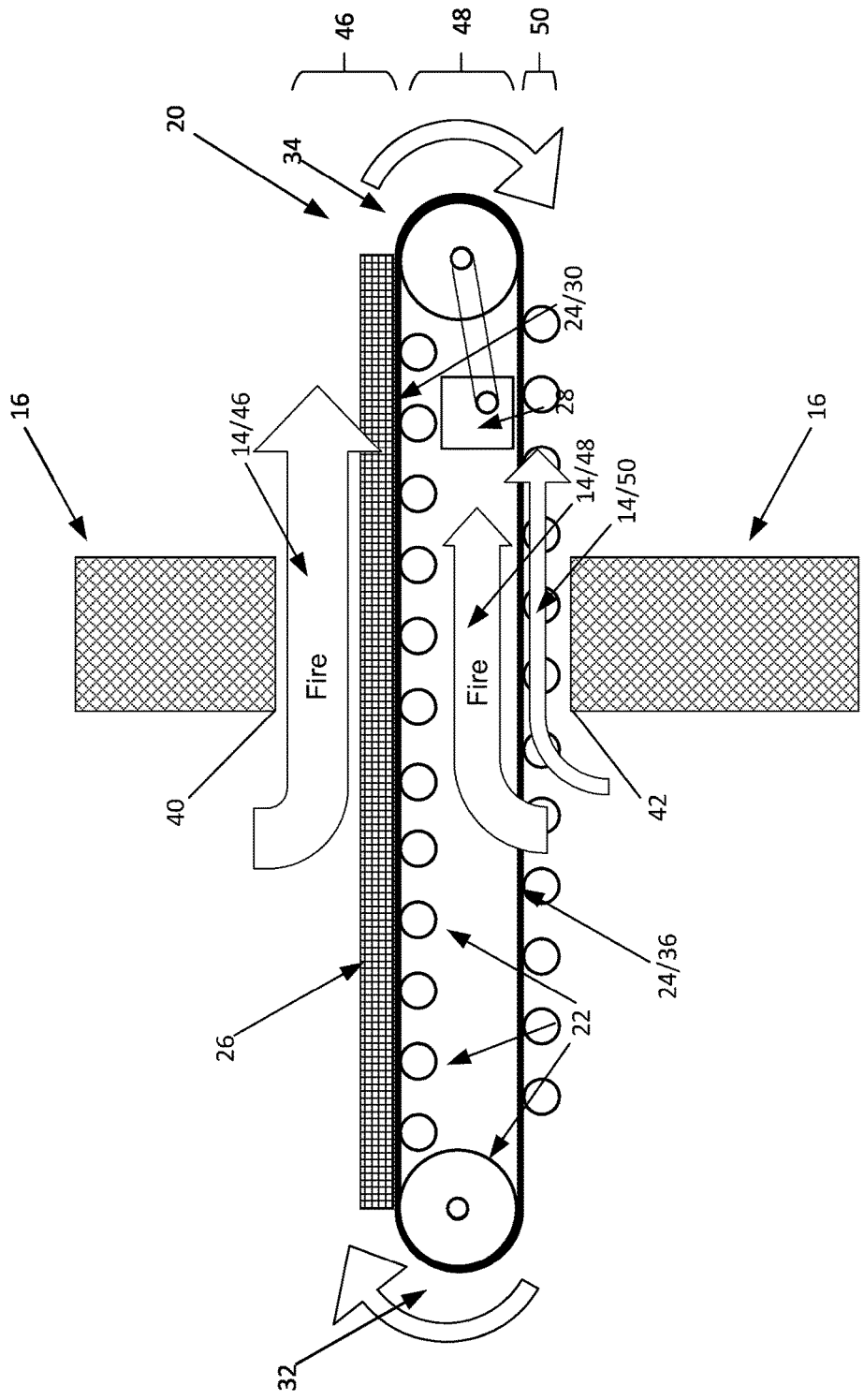
FIG. 1 shows cross sectional a side view of a conveyor system extending through an opening in a fire wall.
Figure 2:
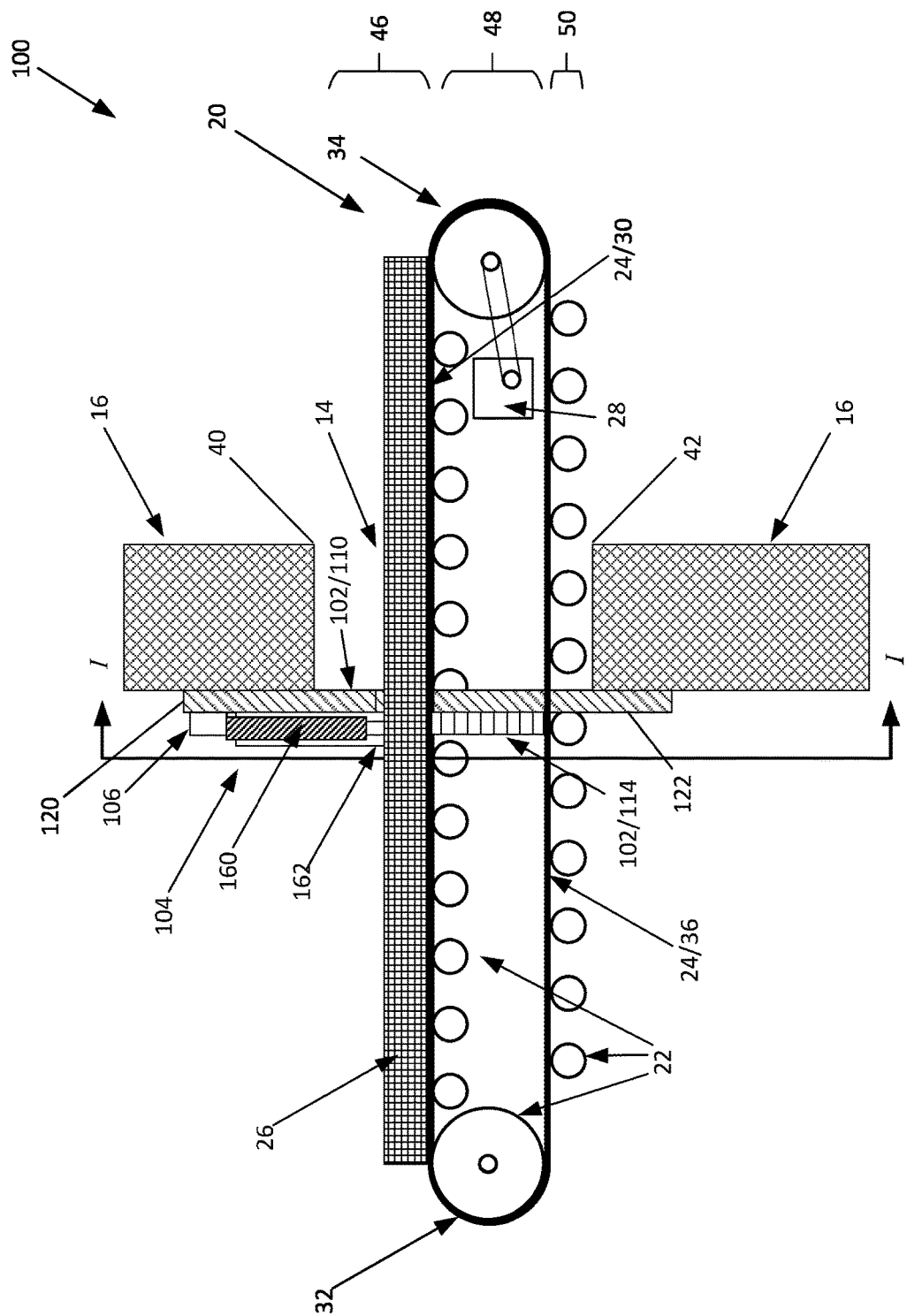
FIG. 2 shows a cross sectional side view of a fire door system installed around a conveyor system extending through an opening in a fire wall, in accordance with one or more embodiments; the view corresponding to cross section II of the views shown in FIGS. 3 and 4.
Figure 3:
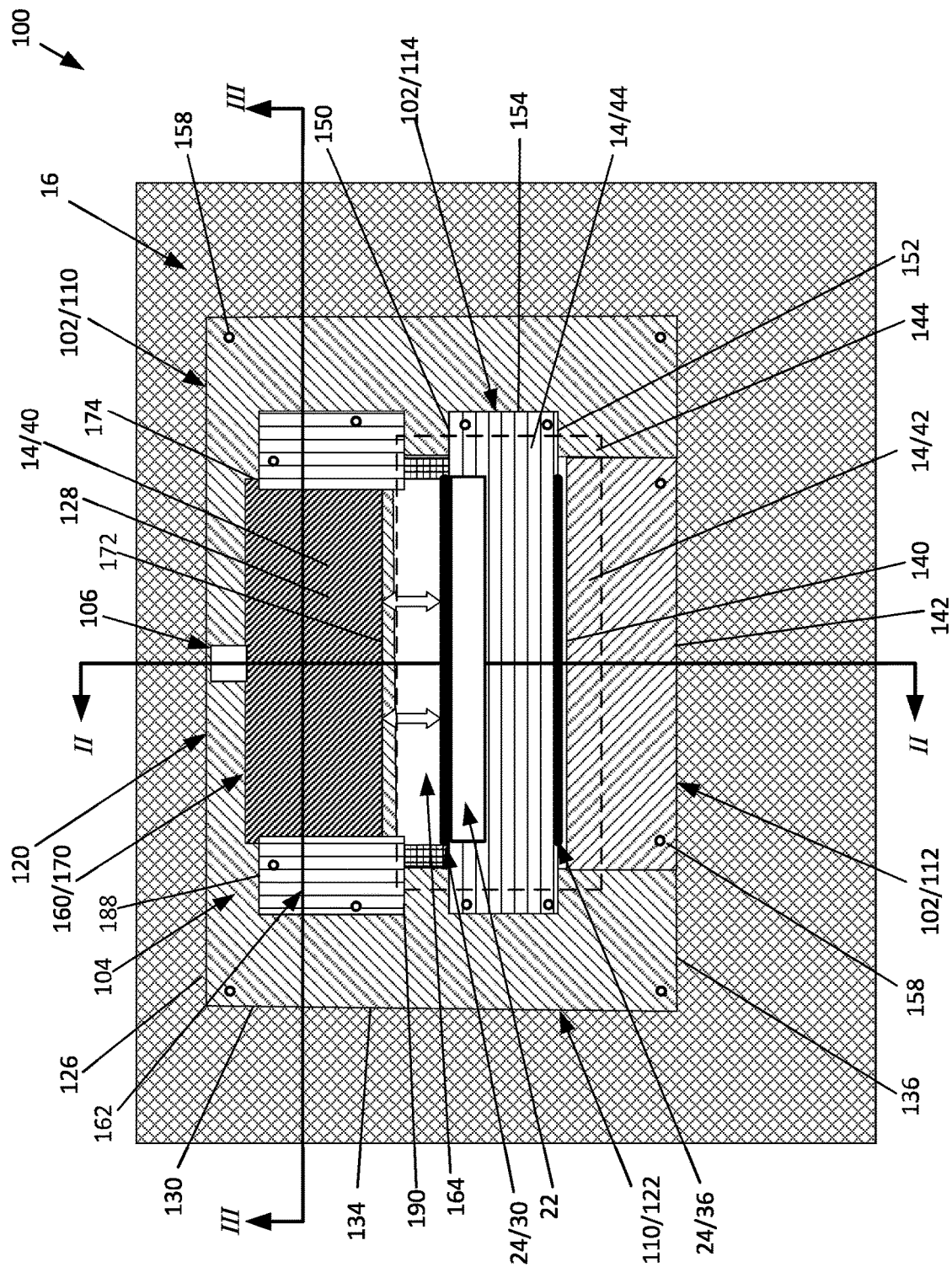
FIG. 3 shows a cross sectional front view of the fire door system shown in FIG. 2, in accordance with one or more embodiments; the view corresponding to cross section I of the view shown in FIG. 2.
Figure 4:
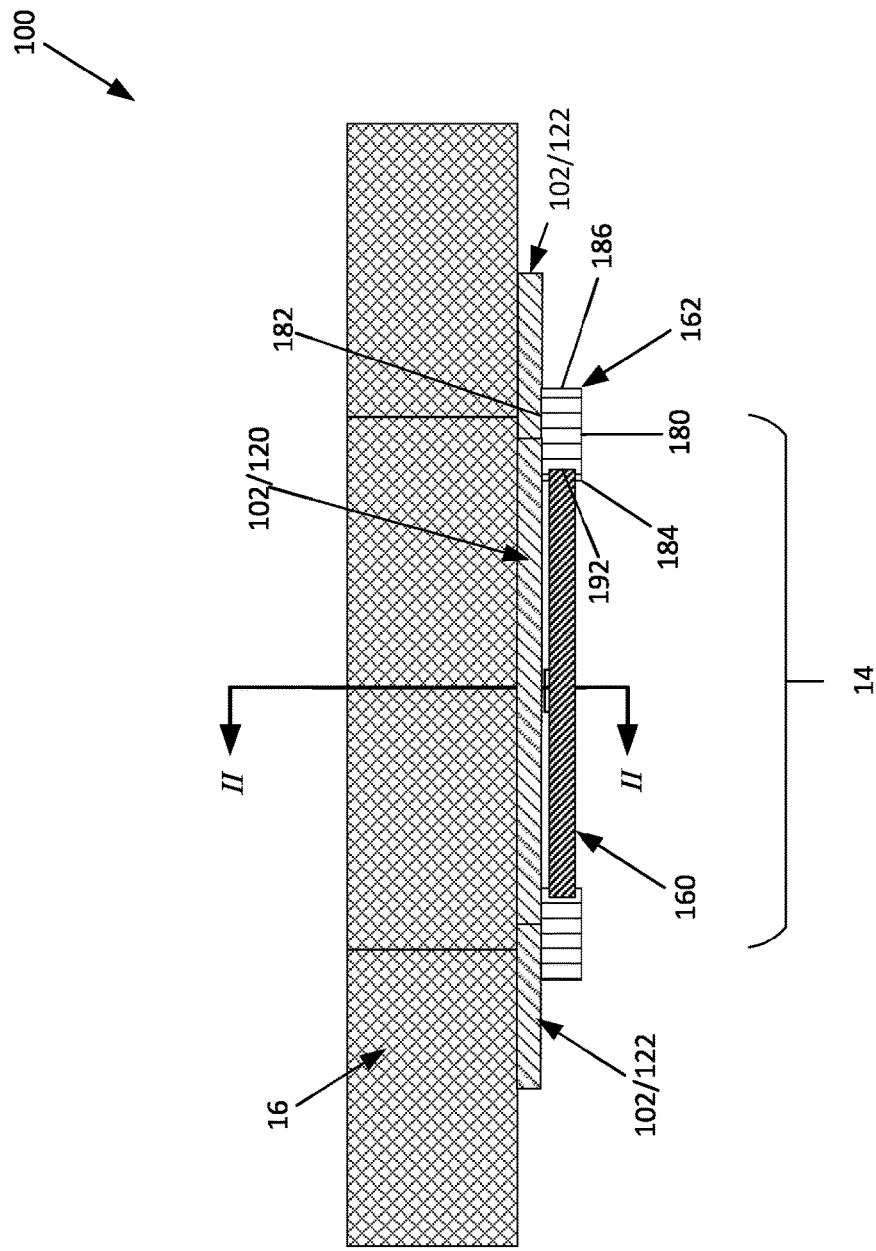
FIG. 4 shows a cross sectional bottom view of the fire door system shown in FIG. 3, in accordance with one or more embodiments; the view corresponding to cross section III of the view shown in FIG. 3.
Figure 5:
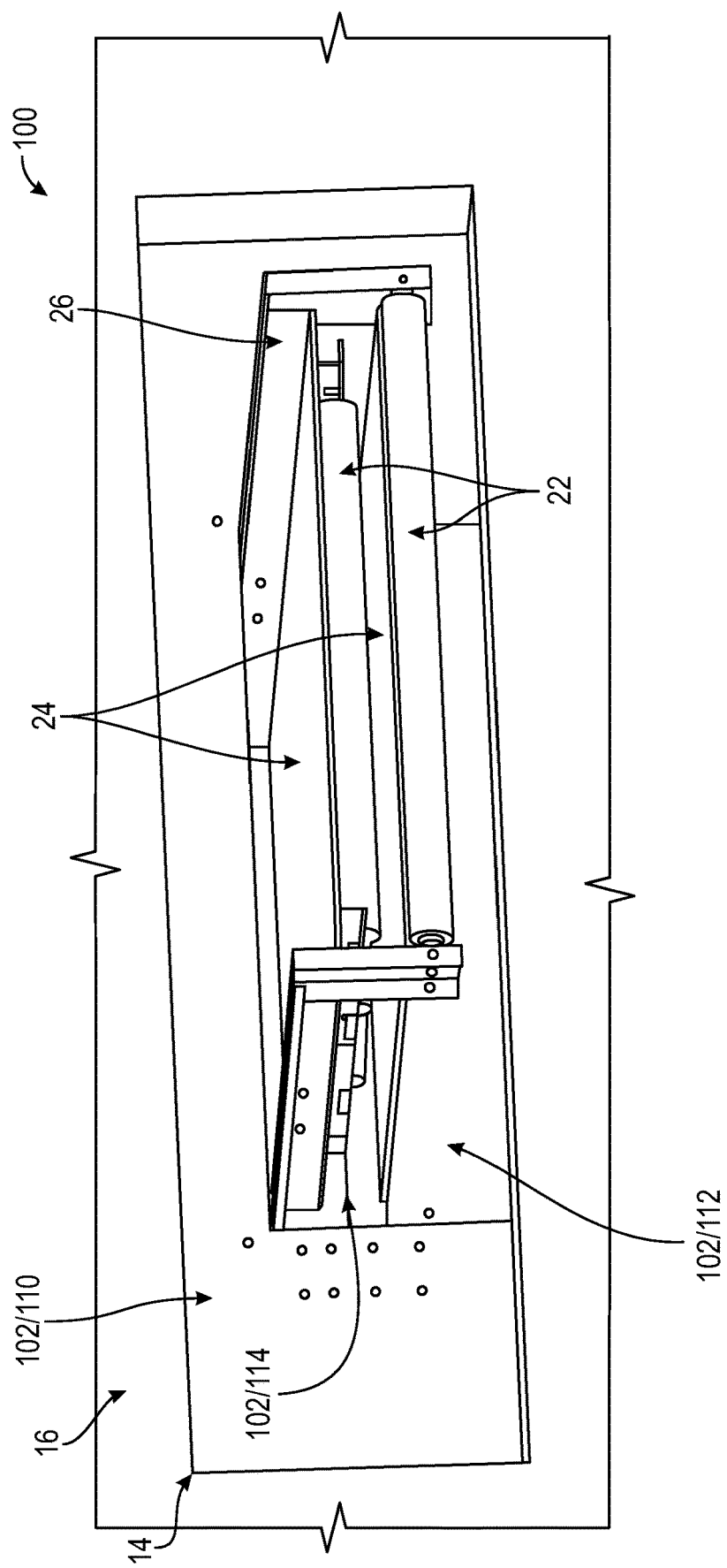
FIG. 5 shows a rear left perspective view of a fire door system installed around a conveyor system extending through an opening in a fire wall, in accordance with one or more embodiments; the view showing a door of the fire door system in an open position.
Figure 6:
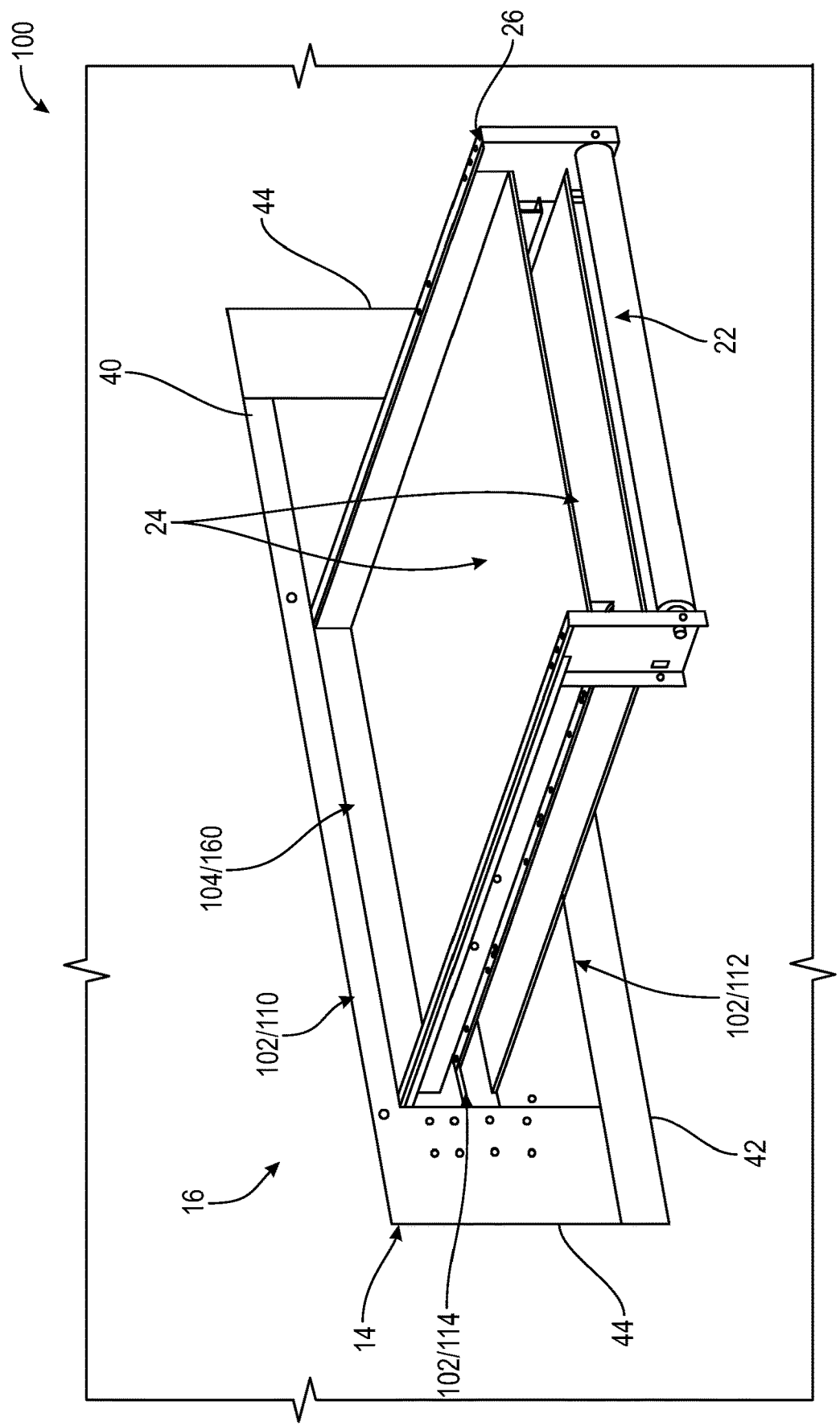
FIG. 6 shows an upper rear left perspective view of a fire door system installed around a conveyor system extending through an opening in a fire wall, in accordance with one or more embodiments; the view showing a door of the fire door system in a closed position.
Figure 7:
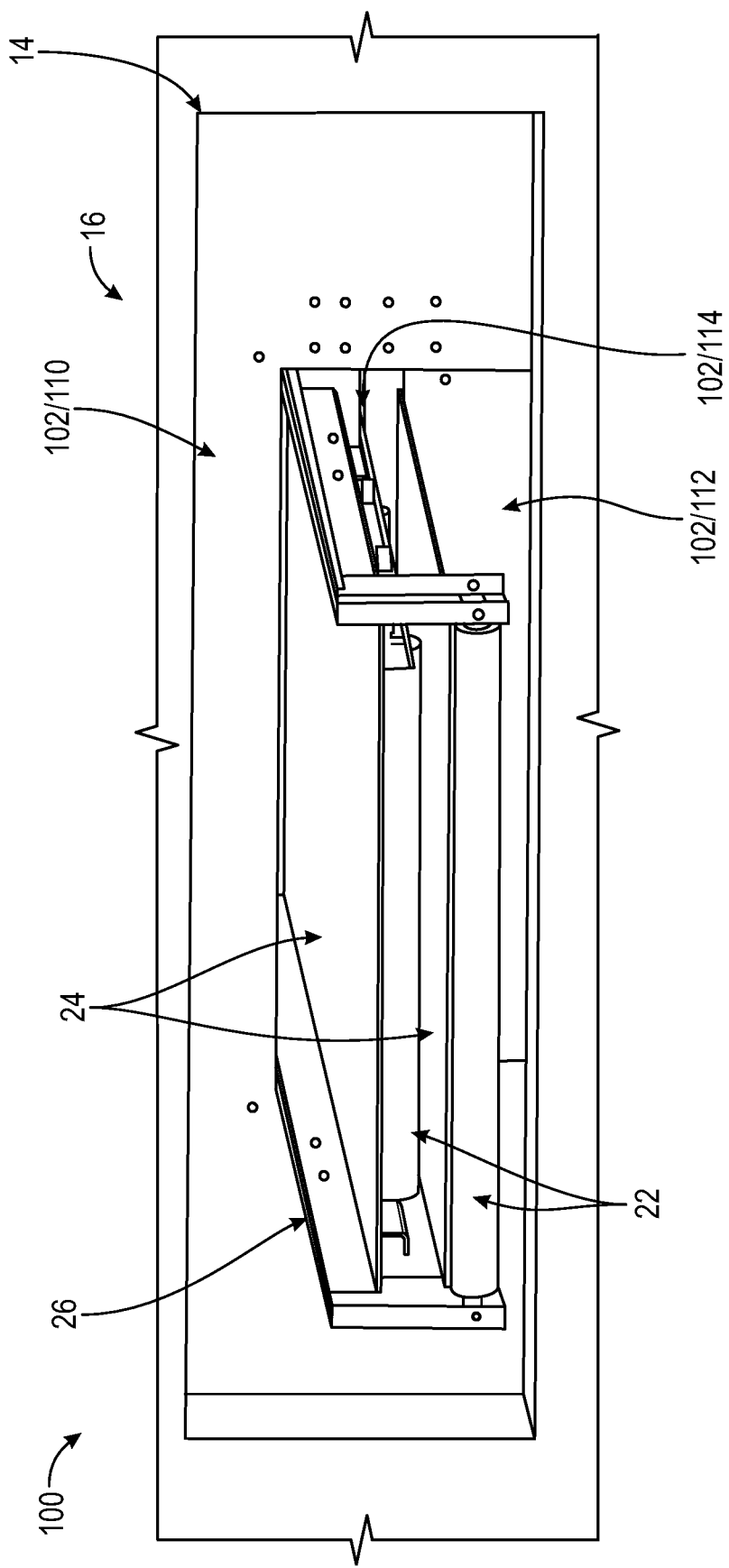
FIG. 7 shows an upper rear right perspective view of a fire door system installed around a conveyor system extending through an opening in a fire wall, in accordance with one or more embodiments; the view showing a door of the fire door system in an open position.
Figure 8:
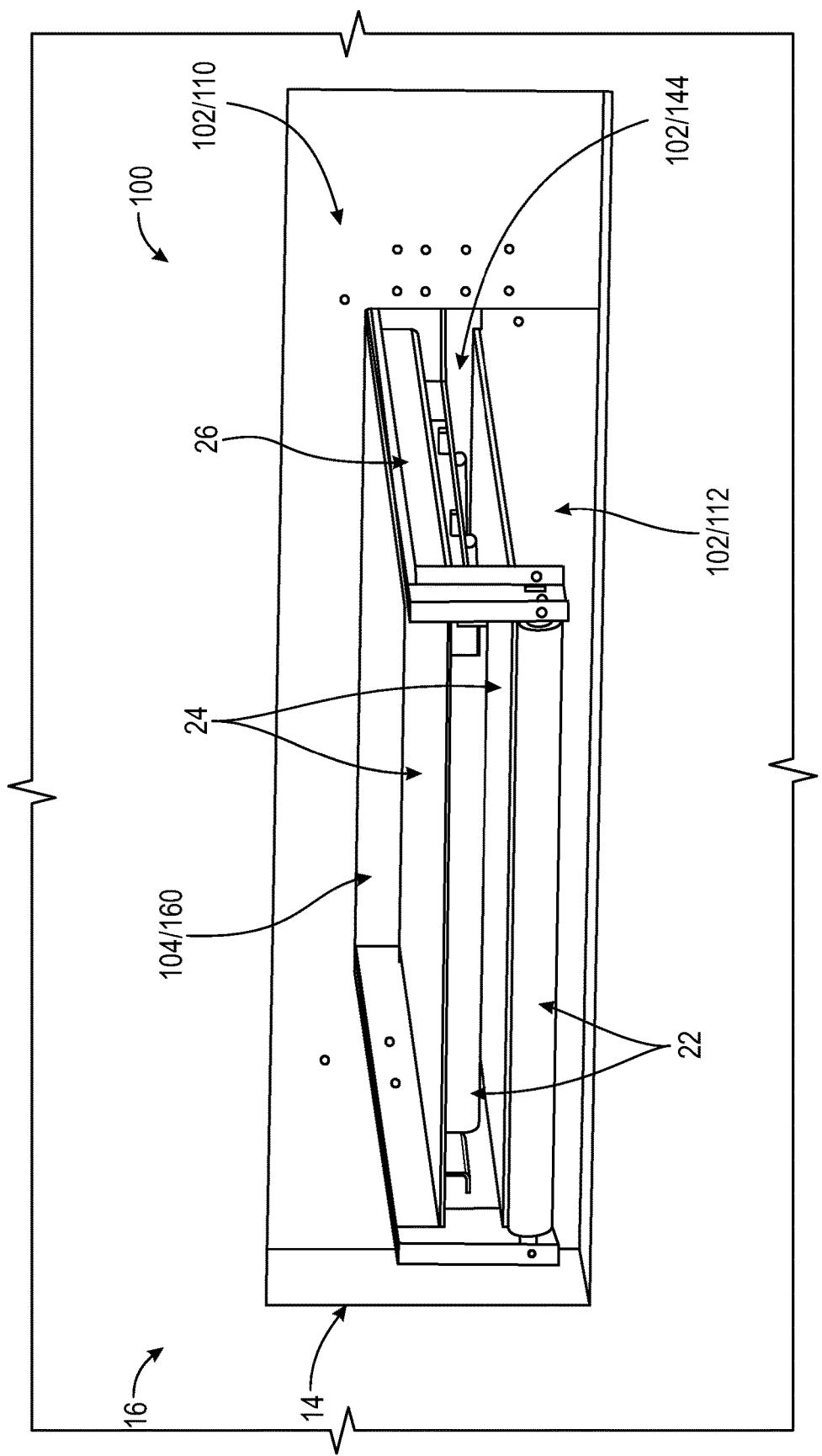
FIG. 8 shows an upper rear right perspective view of a fire door system installed around a conveyor system extending through an opening in a fire wall, in accordance with one or more embodiments; the view showing a door of the fire door system in a closed position.
Figure 9:
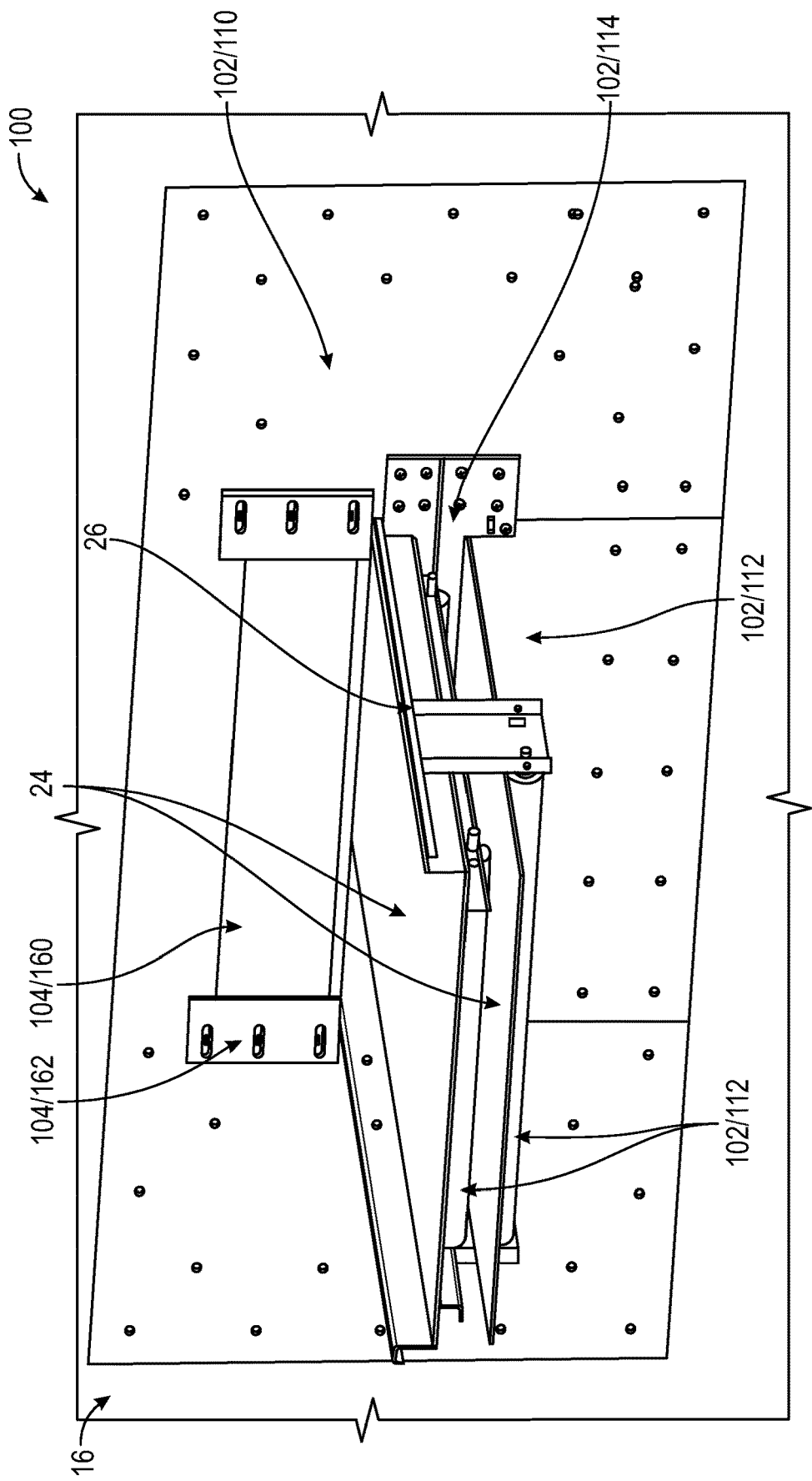
FIG. 9 shows an upper front left perspective view of a fire door system installed around a conveyor system extending through an opening in a fire wall, in accordance with one or more embodiments; the view showing a door of the fire door system in an open position.
Figure 10:
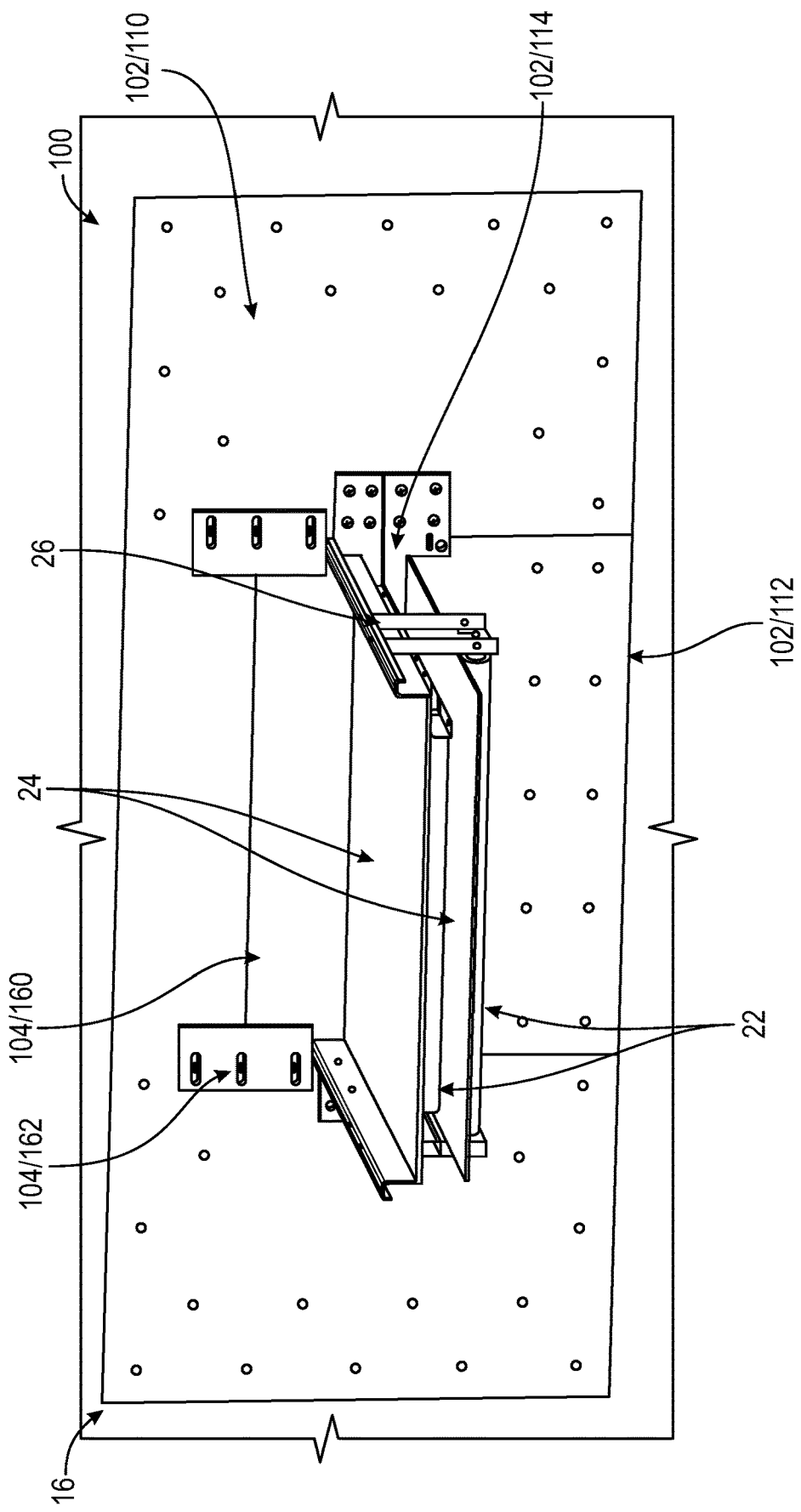
FIG. 10 shows an upper front left perspective view of a fire door system installed around a conveyor system extending through an opening in a fire wall, in accordance with one or more embodiments; the view showing a door of the fire door system in a closed position.
Figure 11:
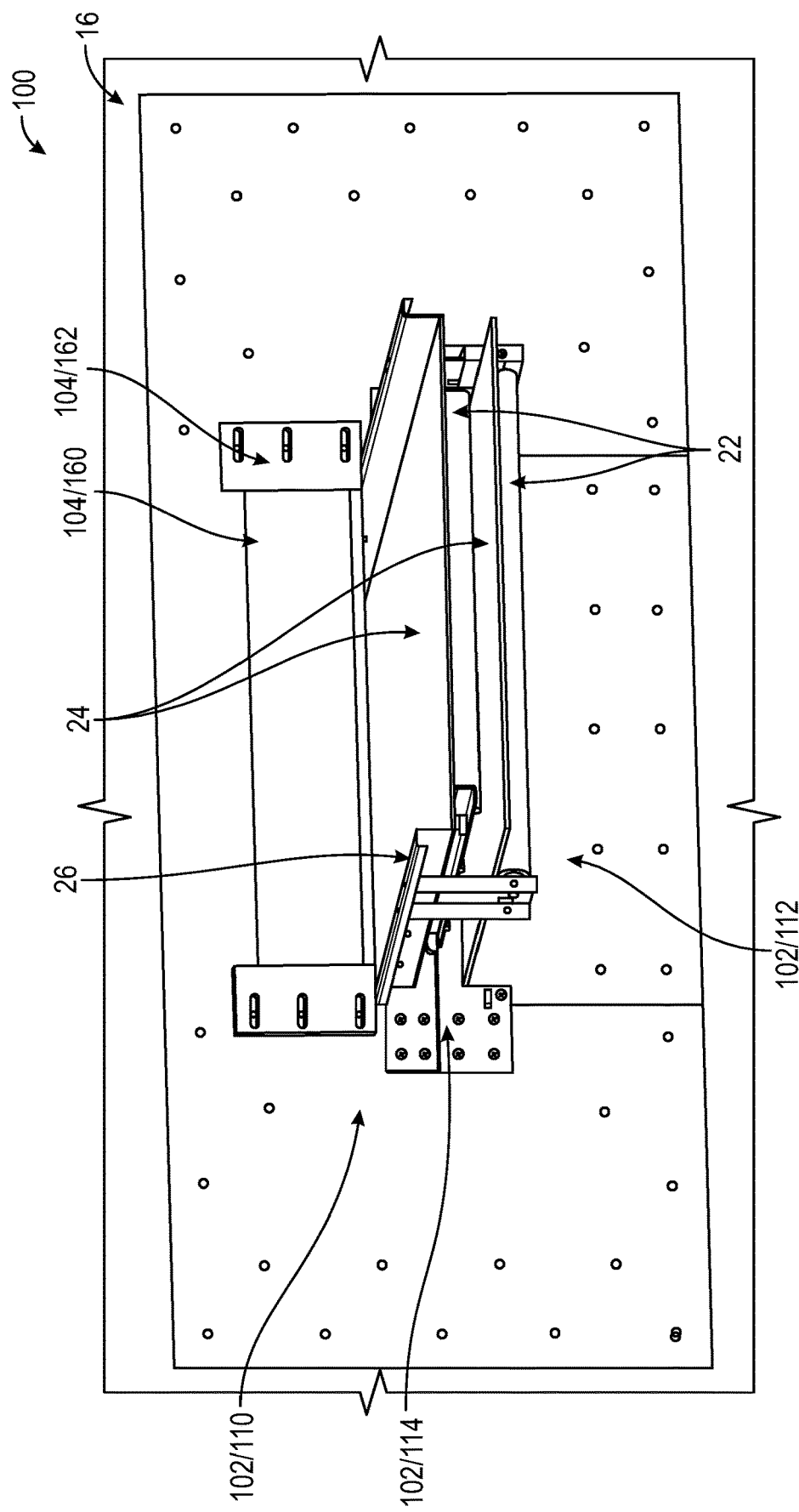
FIG. 11 shows an upper front right perspective view of a fire door system installed around a conveyor system extending through an opening in a fire wall, in accordance with one or more embodiments; the view showing a door of the fire door system in an open position.
Figure 12:
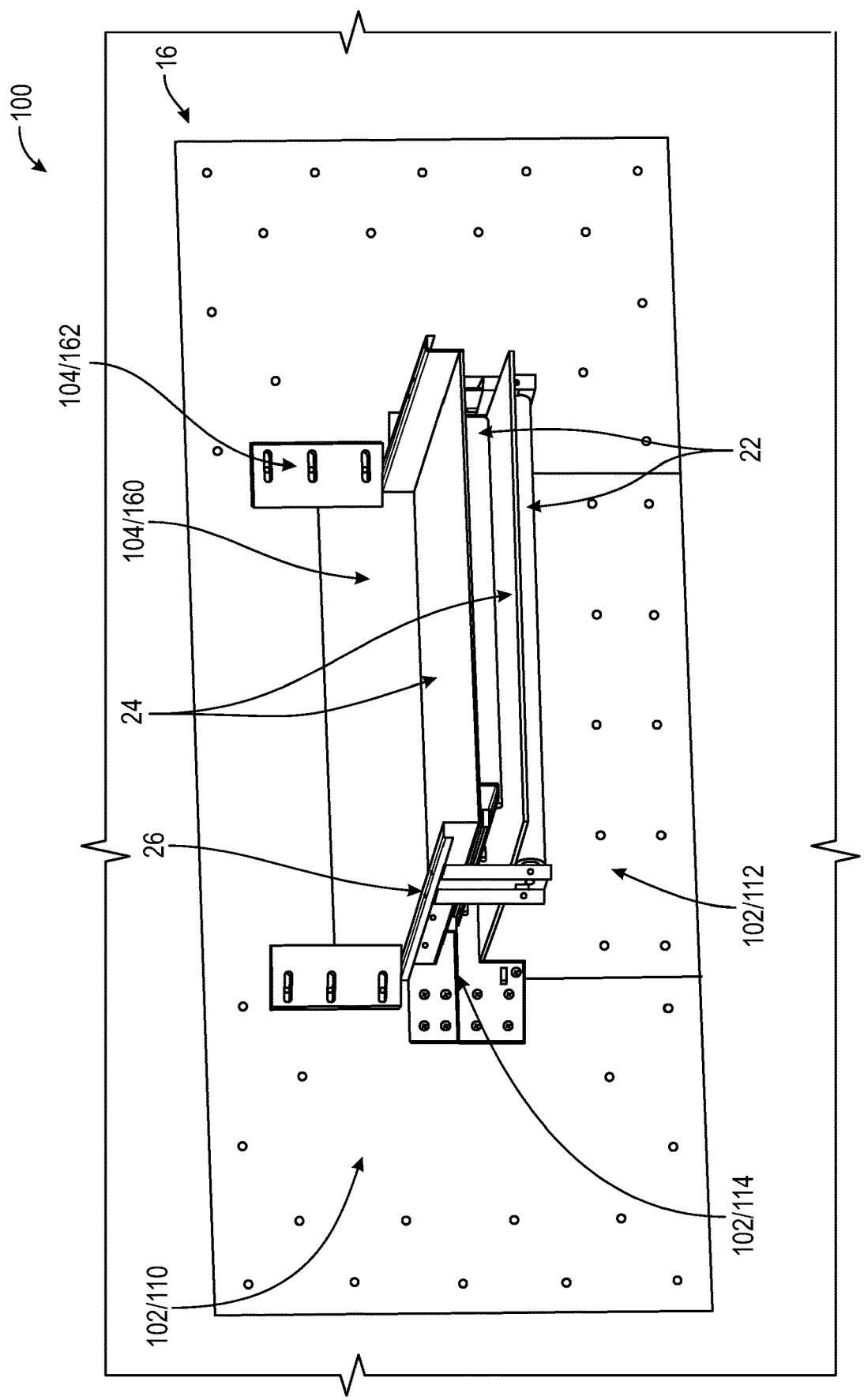
FIG. 12 shows an upper front right perspective view of a fire door system installed around a conveyor system extending through an opening in a fire wall, in accordance with one or more embodiments; the view showing a door of the fire door system in a closed position.
Figure 13:
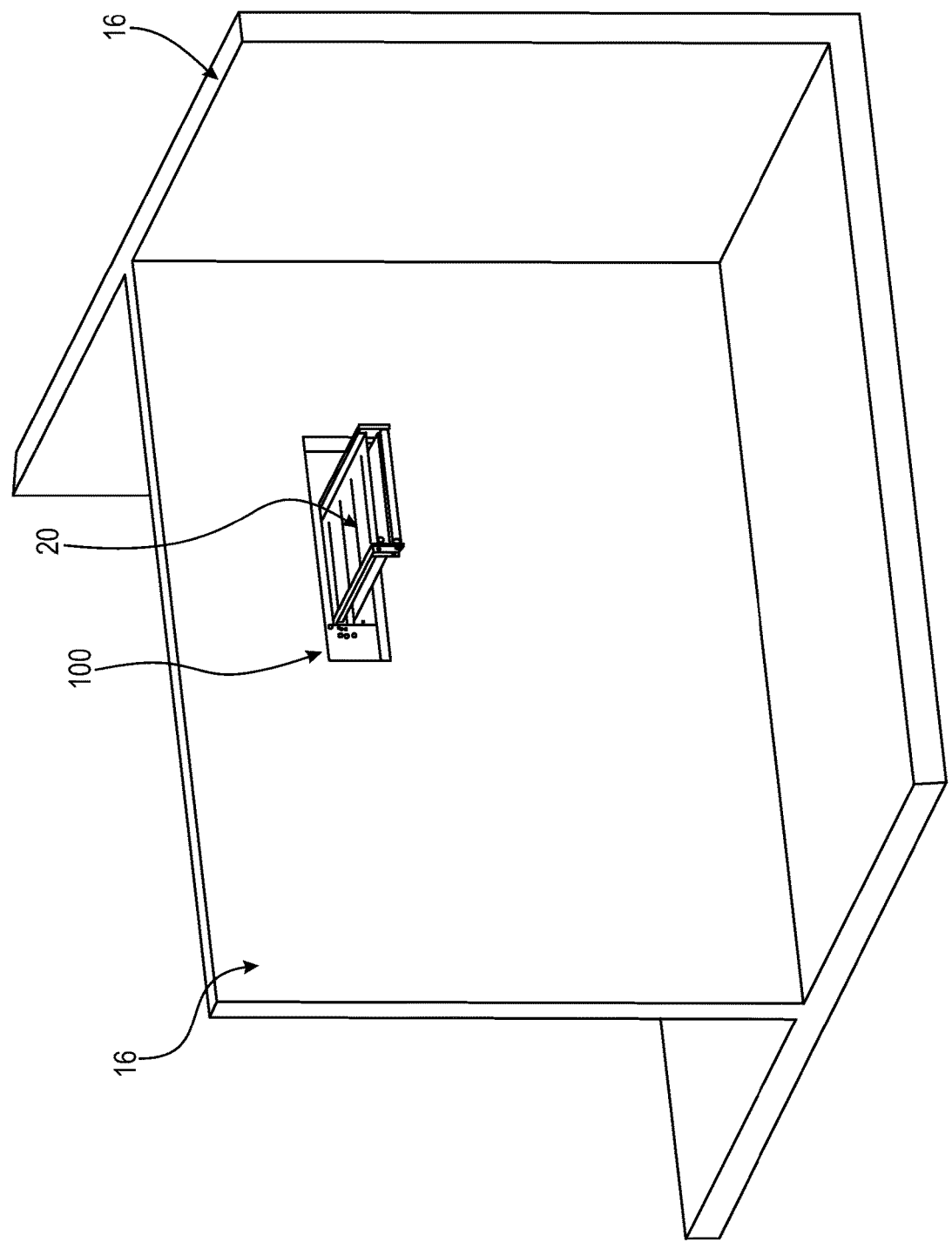
FIG. 13 shows an upper rear left perspective view of a fire door system installed around a conveyor system extending through an opening in a fire wall, in accordance with one or more embodiments; the view showing a door of the fire door system in an open position.
Figure 14:
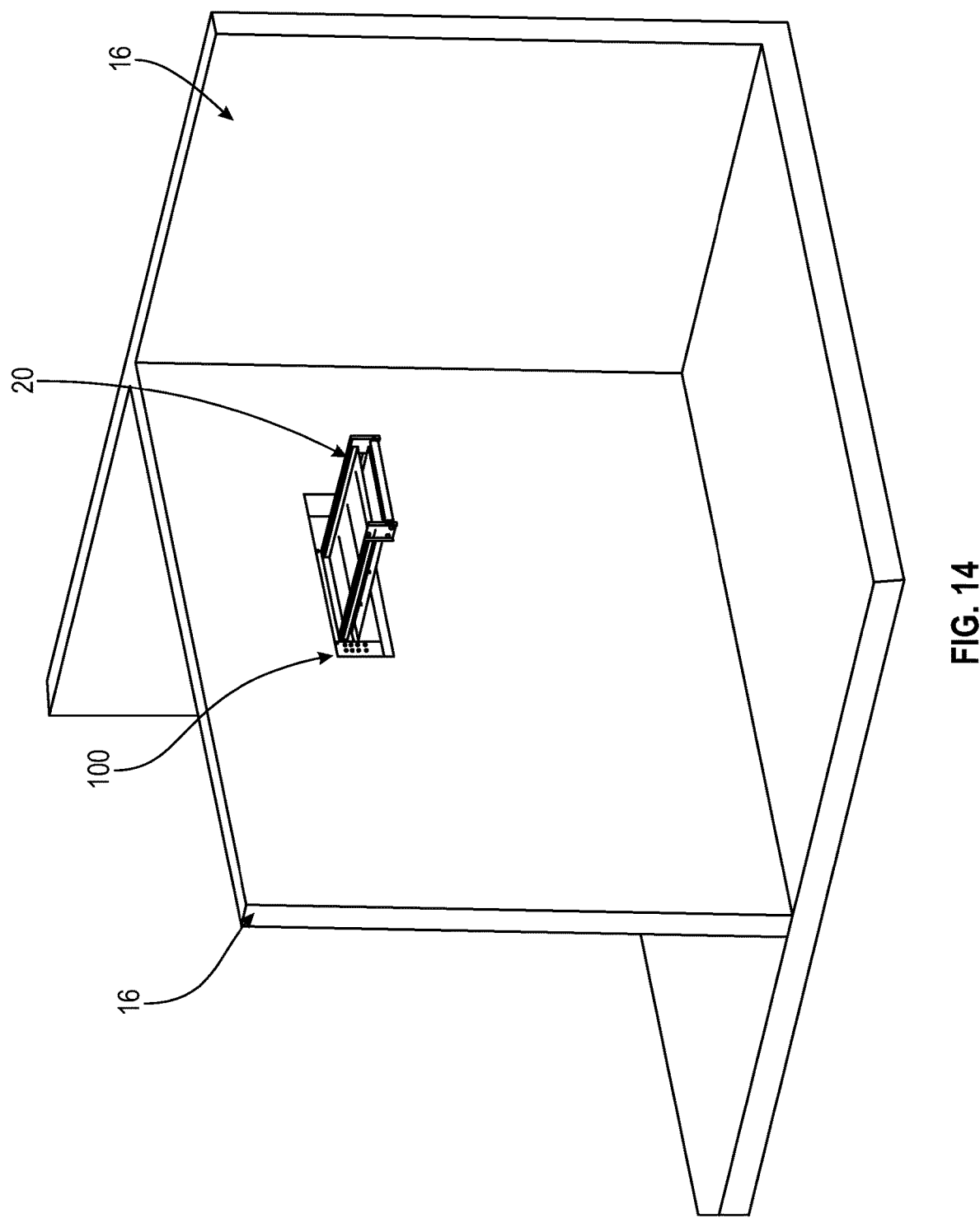
FIG. 14 shows an upper rear left perspective view of a fire door system installed around a conveyor system extending through an opening in a fire wall, in accordance with one or more embodiments; the view showing a door of the fire door system in a closed position.
Figure 15:
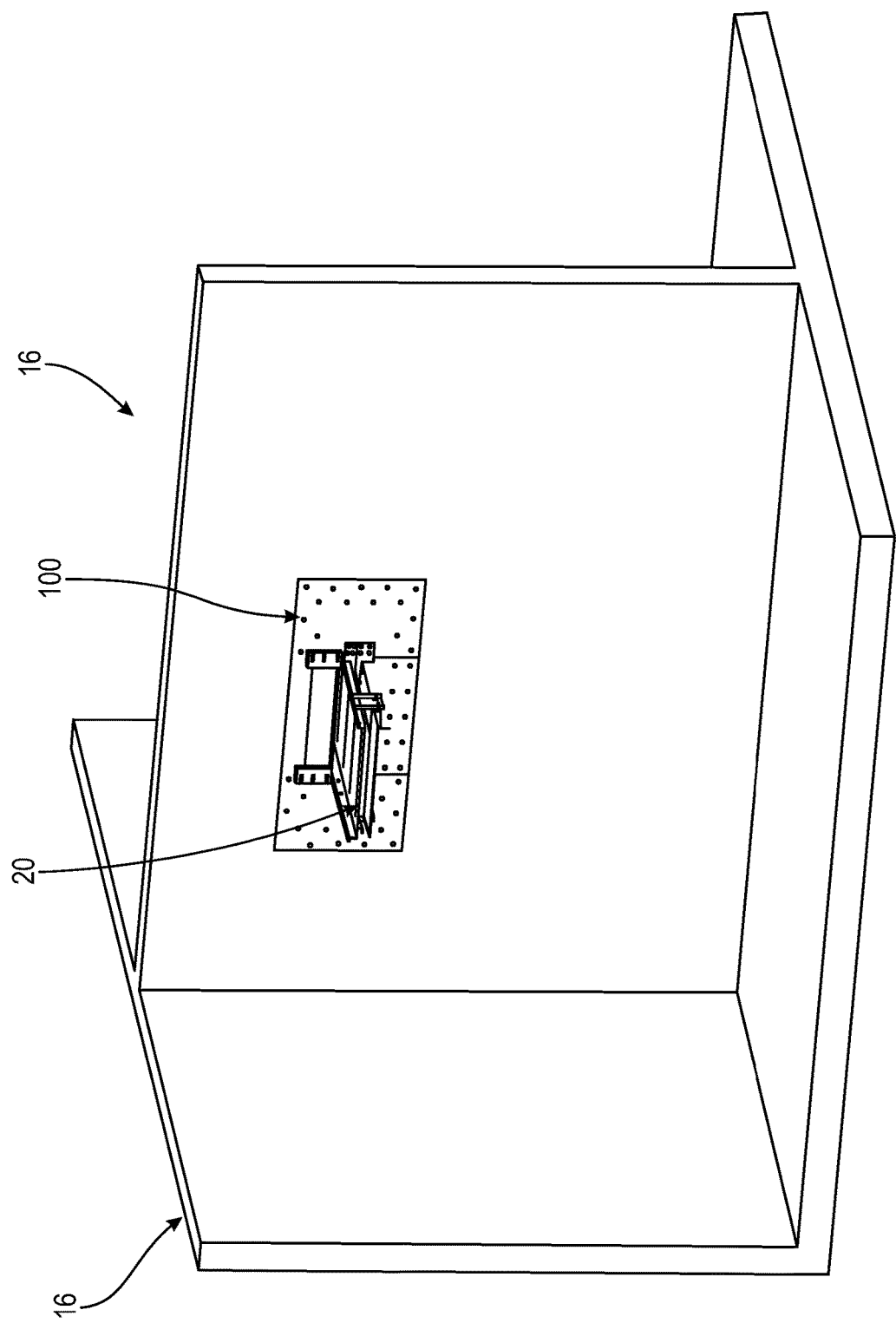
FIG. 15 shows an upper front left perspective view of a fire door system installed around a conveyor system extending through an opening in a fire wall, in accordance with one or more embodiments; the view showing a door of the fire door system in an open position.
Figure 16:
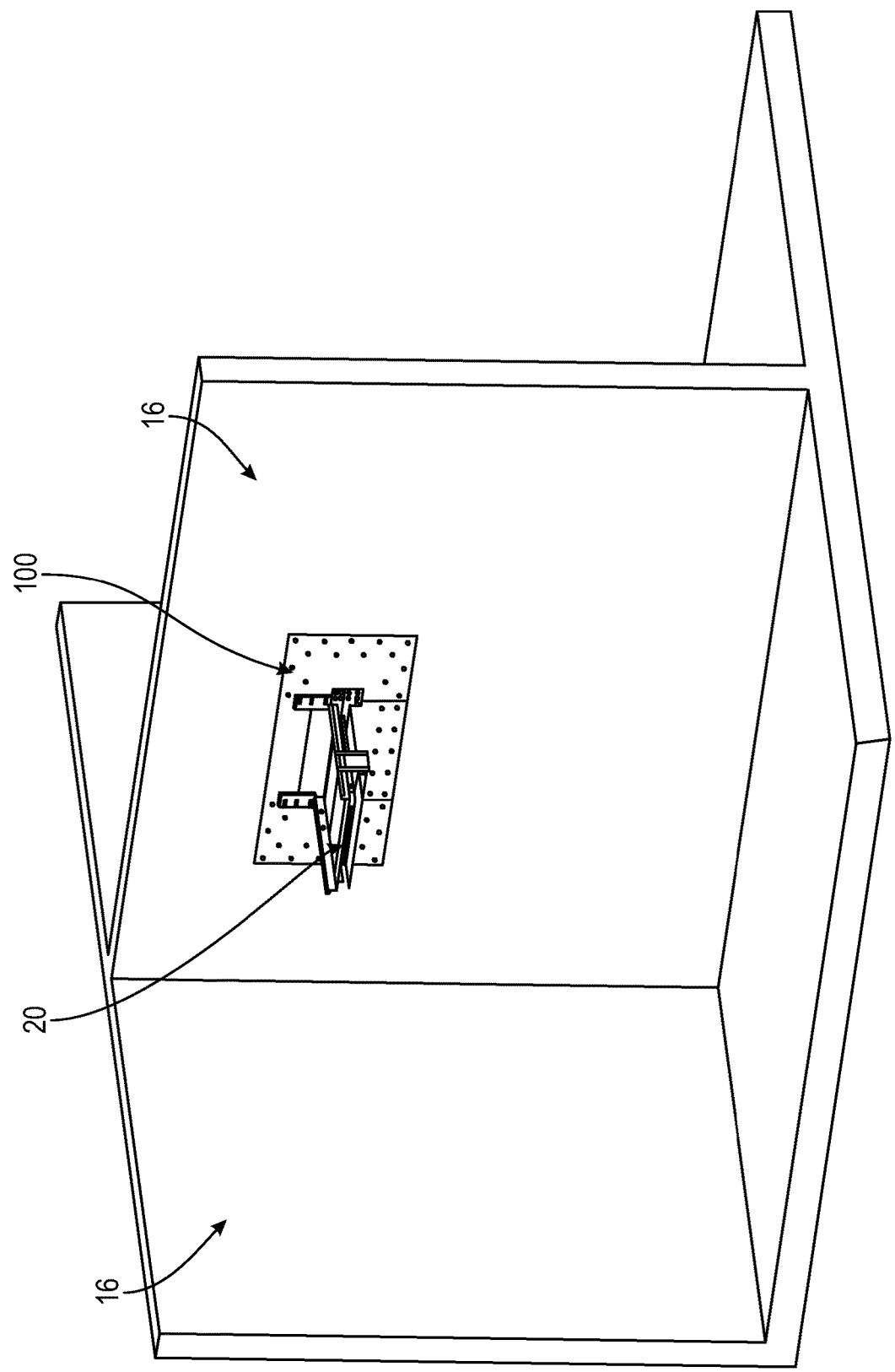
FIG. 16 shows an upper front left perspective view of a fire door system installed around a conveyor system extending through an opening in a fire wall, in accordance with one or more embodiments; the view showing a door of the fire door system in a closed position.
Figure 17:
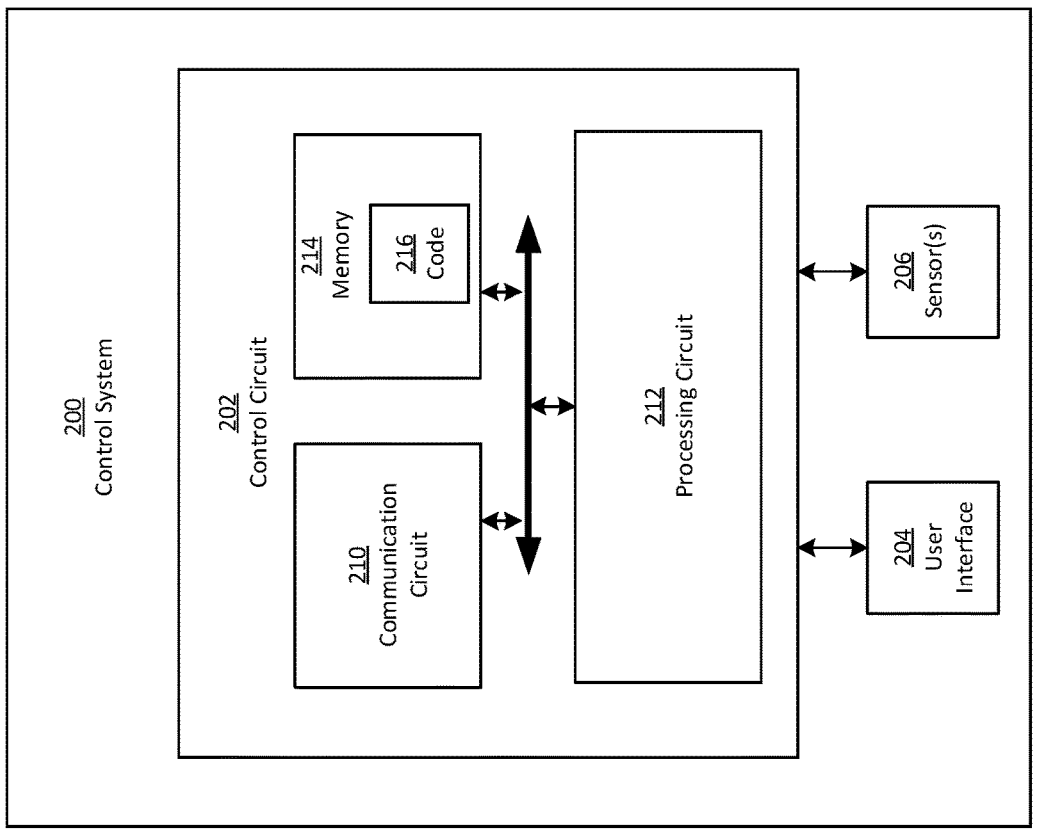
FIG. 17 shows a block diagram of a control system for a fire door system, in accordance with one or more embodiments.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

Any advantages and/or improvements discussed herein may not be provided by various disclosed embodiments, and/or implementations thereof. The contemplated embodiments are not so limited and should not be interpreted as being restricted to embodiments which provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments which address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure.

It is to be understood that the terms such as "left, right, top, bottom, front, backrest, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of such articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected and/or engaged, respectively, in any manner that facilitates operation, which may include being directly connected, indirectly connected, electronically connected, wirelessly connected and/or connected by any other manner, method and/or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments and/or methods.

Similarly, the structures and operations discussed herein may occur out of the order described and/or noted in the figures. For example, two operations and/or figures shown in succession may in fact be executed concurrently and/or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of fire doors for belt-type conveyors in poultry houses. However, the embodiments are not so limited. It is appreciated that the embodiments may be adapted for use with other types of conveyors and/or in other applications which may be improved by the disclosed structures, arrangements and/or methods. The system is merely shown and described as being used in the context of fire doors for belt-type conveyors in poultry houses for ease of description and as one of countless examples.

With reference to the figures, fire door system 100 for a conveyor (or simply system 100) is presented. In the arrangement shown, as one example, the system 100 is used in association with a conveyor 20 extending through an opening 14 in a fire wall 16 (e.g., located between adjacent poultry houses 18 (not shown).

Conveyor 20:

Conveyor 20 may be formed of any suitable size, shape, and design and is configured to transport eggs and/or other items along conveyor 20 and through opening 14 in fire wall 16. Most commonly, existing poultry operations use a belt-type conveyor 20 to transport eggs and/or other items. In the arrangement shown, as one example, conveyor 20 is a belt-type conveyer having rollers 22, a belt 24 positioned on rollers 22, guide rails 26, and a motor 28.

During operation, motor 28 causes belt 24 to be rotated around rollers 22 in a loop. Motor 28 is formed of any suitable size, shape, and design and is configured to generate mechanical movement. In the arrangement shown, as one example, motor 28 is an electric motor (e.g., a DC motor or an AC motor) configured to convert electric power into rotational motion. However, embodiments are not so limited. For example, in some arrangements, motor 28 may be an internal combustion engine, a fluid driven engine (e.g., steam, water, and/or air driven), or any other type of motor or engine.

In the example arrangement shown, a drive shaft of motor 28 is operatively connected to pull an upper portion 30 of belt 24 at a destination end 34 of conveyor 20 when operated, which cause belt 24 to be rotated around rollers 22 in a continuous loop. However, the embodiments are not so limited. Rather, it is contemplated that in various embodiment motor 28 may be operatively connected to belt 24 using various methods or means known in the art. As one example, on a rod conveyor or other interlocking type conveyor, the drive shaft of motor 28 may be operably connected to multiple smaller geared drive units positioned along the length of the conveyor 20 to cause belt 24 to be rotated around rollers 22 in a continuous loop. In one or more arrangements, speed of motor 28 is adjustable to facilitate adjustment of the speed at which belt 24 is rotated.

Rotation of belt 24 carries eggs and/or other items along conveyor 20 on upper portion 30 of belt 24 from a source end 32, through opening 14 to destination end 34 of conveyor 20. Guide rails 26 prevent eggs or other items from falling off sides of the belt 24 while being transported. At a destination end 34 of conveyor 20, eggs and/or other items are moved off belt 24 to their destination and belt 24 wraps around a roller 22 at the destination end 34, and lower portion 36 of belt 24 is pulled back toward the source end 32.

In the arrangement shown, as one example, opening 14 has a generally rectangular shape extending between an upper end 40, a lower end 42, and opposing sides 44. Belt 24 partitions opening 14 into an upper opening 46 above upper portion 30 of belt 24, a middle opening 48 between upper portion 30 of belt 24 and lower portion 36 of belt 24, and a lower opening 50 below lower portion 36 of belt 24. In the case of fire on either side of fire wall 16, fire may spread between poultry houses through upper opening 46 and/or lower opening 50. Moreover, fire may pass through middle opening 48 after entering a side of conveyor 20 (if uncovered) or once belt 24 is burned away.

Due to the multiple pathways for fire to pass around conveyor 20 through opening 14 it is a particular challenge to provide a fire door that can prevent the spread of fire for this type of conveyor. For many large-scale operations, it may be prohibitively expensive to replace conveyors 20 with new conveyors designed to prevent the spread of fire. For many large-scale operations, it may even be prohibitively expensive to retrofit existing conveyors 20 to accommodate a fire door if installation would require dismantling of the conveyors 20. In one or more arrangements, fire door system 100 is configured to close off upper opening 46, middle opening 48 and lower opening 50 of a belt-type conveyor 20 to prevent fire from passing therethrough. In one or more arrangements, system 100 is configured to be installed around a fully assembled conveyor 20, thereby reducing downtime and installation costs.

System 100:

System 100 is formed of any suitable size, shape, and design and is configured to cover opening 14 around conveyor 20 on demand to prevent the spread of fire. In the arrangement shown, as one example, system 100 includes a door frame assembly 102, a door assembly 104, and an actuator 106 among other components.

Door Frame Assembly 102:

Door frame assembly 102 is formed of any suitable size, shape, and design and is configured to facilitate attachment to fire wall 16 and cover upper opening 46, middle opening 48, and lower opening 50, and form a door opening above upper portion 30 of belt 24, without inhibiting movement of belt 24. In the arrangement shown, as one example, door frame assembly 102 is formed of a plurality of segments including an upper section 110, a lower section 112, and a center section 114. The use of segments allows door frame assembly 102 to enclose all openings around conveyor 20 except door opening 164 while permitting installation of door frame assembly 102 without disassembly of conveyor 20.

Upper Section 110:

In this example arrangement, upper section 110 has a top member 120 and a pair of side members 122 extending downward from top member 120 along sides of conveyor 20. In this example arrangement, upper section 110 has a generally rectangular planar shape extending between an upper edge 126, a lower edge 128, and opposing side edges 130. In this example arrangement, side members 122 each have a generally rectangular planar shape extending downward from lower edge 128 of top member 120 between opposing side edges 134 to a bottom edge 136. In this example arrangement, outer side edges 134 of side members 122 are aligned with side edges of top member 120. In this example arrangement, inner side edges 134 of side members 122 are configured to fit along sides of conveyor 20 with close and tight tolerances. In this example arrangement, upper edge 126, side edges 130, and outer side edges 134 overlay fire wall 16 along upper end 40 and sides 44 of opening 14 to facilitate connection of lower section 112 to fire wall 16.

Lower Section 112:

In this example arrangement, lower section 112 has a generally rectangular planar shape extending between a top edge 140, a bottom edge 142, and opposing side edges 144. In this example arrangement, side edges 144 of lower section 112 align with inner side edges 134 of side members 122 of upper section 110 and top edge 140 of lower section 112 is positioned in close proximity to lower portion 36 of belt 24. In this example arrangement, bottom edge 142 overlays fire wall 16 along lower end 42 of opening 14 to facilitate connection of lower section 112 to fire wall 16.

Center Section 114:

Center section 114 is configured to cover middle opening 48 between upper portion 30 and lower portion 36 of belt 24. In this example arrangement, center section 114 has a generally rectangular planar shape extending between a top edge 150, a bottom edge 152, and opposing side edges 154. In this example arrangement, bottom edge 152 of center section 114 is positioned in close proximity to lower portion 36 of belt 24 and top edge 150 of center section is positioned in close proximity to upper portion 30 of belt 24. In this example arrangement, side edge 154 overlay side member 122 of upper section 110 to facilitate connection of center section 114 to upper section 110.

Fasteners 158:

In the arrangement shown, as one example, upper section 110, lower section 112, and center section 114 of door frame assembly 102 are connected together and/or to fire wall 16 by fasteners 158. Fasteners 158 are formed of any suitable size, shape, and design and are configured to facilitate permanent or semi-permanent connection. In the arrangement shown, fasteners 158 are bolts that extend through door frame assembly 102. However, the embodiments are not so limited. Rather, it is contemplated that in one or more arrangements, upper section 110, lower section 112, and/or center section 114 of door frame assembly 102 and/or other components of system 100 may be connected together and/or to fire wall 16 using various methods and/or means including but not limited to, for example, screws, bolts, clamps, pins, rivets, welding, snap connectors, interconnects (e.g., slide connectors, rotational connectors, and/or any other type of interconnect), friction fit connectors, adhesives, chemical bonding, and/or any other process and/or means that results in a permanent or semi-permanent connection.

Door Assembly 104:

Door assembly 104 is formed of any suitable size, shape, and design and is configured to provide an opening 164 when a door 160 is in an open position and cover the opening 164 when door 160 is in a closed position. In the arrangement shown, as one example, door assembly 104 includes door 160 and a pair of door tracks 162.

Door 160:

Door 160 is formed of any suitable size, shape, and design and is configured to cover opening 164 when door 160 is in the closed position to prevent fire from passing through opening 164. In the arrangement shown, as one example, door 160 has a generally rectangular planar shape extending between a top edge 170, a bottom edge 172, and opposing side edges 174.

Sliding Door Tracks 162:

Sliding door tracks 162 are formed of any suitable size, shape, and design and are configured to operably connect with door 160 and facilitate movement of door 160 along the sliding door tracks 162 between the open position and the closed position. In the arrangement shown, as one example, sliding door tracks 162 each have an elongated rectangular shape having a front surface 180, a rear surface 182, an inner side 184, and an outer side 186, extending between an upper end 188 and a lower end 190. In this example arrangement, sliding door tracks 162 includes a slot 192 formed in inner side 184 and extending the length of the sliding door track 162 from upper end 188 to lower end 190. In this example arrangement, each slot 192 is configured to receive and hold one of the side edges 174 of door 160. When assembled, door 160 is held within slots 192 and between sliding door tracks 162 positioned alongside side edges 134 of side members 122 of upper section 110 of door frame assembly 102.

In the arrangement shown, door 160 operates as a gravity drop door that is held in the open position by the actuator 106 and moves under its own weight from the open position to the closed position within sliding door tracks 162 when the actuator 106 disengages from door 160. However, the arrangements are not so limited. Rather, it is contemplated that in some various arrangements, door 160 may be configured to move by sliding, swinging or any other movement. Furthermore, it is contemplated that in one or more arrangements movement of door from the open position to the closed position may require application of force to door 160 by actuator 106.

Actuator 106:

Actuator 106 is formed of any suitable size, shape, and design and is configured to facilitate closing of door 160 when fire occurs. In the arrangement shown, door 160 is a gravity drop door that is held in the open position by the actuator 106 and falls under its own weight from the open position to the closed position when the actuator 106 disengages from door 160. In an example arrangement, actuator 106 is a fusible link that connects with and holds door 160 in the open position and is configured to melt or otherwise detach from door 160 when a threshold temperature indicative of fire (e.g., 165 degrees) is reached, thereby permitting the door 160 to move to the closed position. However, the embodiments are not so limited. Rather, it is contemplated that actuator 106 may hold door 160 in the open position when no fire is present using various passive and/or active methods and/or means including but not limited to, for example, fusible links, electromagnetic latches, solenoids, motorized latches and/or actuators, linear actuators, exploding bolts, or any other method or means for automated closing of door 160 in response to fire. Additionally or alternatively, actuator 106 may include a manual actuated mechanism configured to cause actuator 106 to release and/or otherwise cause door 160 to be moved to the closed position. Such manual actuated mechanism may include but is not limited to, for example, a handle, lever, knob, slider, wheel, pull, switch, button, or any other method or means for actuating by a user.

Materials:

Door frame assembly 102, door assembly 104, and/or various other components of system may be formed using various high temperature, fire resistant, and/or fireproof materials. In the arrangement shown, door frame assembly 102, door assembly 104, and/or some various other components are formed of steel plating. However, the embodiments are not so limited. Rather, it is contemplated that in one or more various arrangements, door frame assembly 102, door assembly 104, and/or other components of system 100 may be formed of one or more various different materials including but not limited to, for example, steel, titanium, tungsten, molybdenum, nickel, tantalum, or an alloy or any other metallic material, ceramics, mineral wool, gypsum boards, asbestos cement, perlite boards, corriboard, calcium silicate, sodium silicate, potassium silicate, brick, concrete, cement render, glass, magnesium oxide (MgO), geobond asbestos substitute, ablative materials (e.g., subliming or melting ablators, charring ablators, and/or intumescent ablators), intumescent materials, fire rated caulking and/or sealants, and/or any other material tolerant of high temperatures as well as any combination thereof.

Control System 200:

In one or more arrangements, system 100 includes a control system 200. Control system 200 is formed of any suitable size, shape, and design and is configured to control operation of actuator 106 and/or other components of system 100 to facilitate closing and/or opening of door 160 in response to indication of fire by signals of sensors 206 and/or input from user interface 204. In the arrangement shown, as one example, control system 200 includes a control circuit 202, user interface 204, and/or sensors 206, among other components.

Control Circuit 202:

Control circuit 202 is formed of any suitable size, shape, design and is configured to control operation of actuator 106 and/or other components of system 100 to facilitate closing and/or opening of door 160 in response to indication of fire by signals of sensors 206 and/or input from user interface 204. In the arrangement shown, as one example implementation, control circuit 202 includes a communication circuit 210, a processing circuit 212, and a memory 214 having software code 216 or instructions that facilitates the operation of system 100.

Processing circuit 212 may be any computing device that receives and processes information and outputs commands according to software code 216 stored in memory 214. For example, in some various arrangements, processing circuit 212 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 214. Memory 214 may be any form of information storage such as flash memory, ram memory, dram memory, a hard drive, or any other form of memory.

Processing circuit 212 and memory 214 may be formed of a single combined unit. Alternatively, processing circuit 212 and memory 214 may be formed of separate but electrically connected components. Alternatively, processing circuit 212 and memory 214 may each be formed of multiple separate but communicatively connected components.

Software code 216 is any form of instructions or rules that direct processing circuit 212 how to receive, interpret and respond to information to operate as described herein. Software code 216 or instructions is stored in memory 214 and accessible to processing circuit 212. As an illustrative example, in one or more arrangements, software code 216 or instructions may configure processing circuit 212 control circuit 202 to monitor sensors 206 to facilitate detection of fires and/or triggering of various actions.

As some illustrative examples, some actions that may be triggered by control circuit 202 in response to detecting fire may include but are not limited to, for example, closing doors 160 of conveyors 20 that are proximate to a poultry house 18 where fire was detected, dosing doors 160 of all conveyors 20, triggering fire suppression systems (e.g., sprinklers); sounding an alarm, alerting fire department, transmitting and/or otherwise communicating alerts to staff (e.g., via automated call, SMS, push notification, email, messaging on social networks, or any other means or methods for messaging). In one or more arrangements, operation of control circuit 202 is configurable by a user via user interface 204 to customize criteria for determining when fire is detected and/or actions to take in response to detecting fire.

Communication circuit 210 is formed of any suitable size, shape, design, technology, and in any arrangement and is configured to facilitate communication with devices to be controlled, monitored, and/or alerted by process control system 200. In one or more arrangements, as one example, communication circuit 210 includes a transmitter (for one-way communication) or transceiver (for two-way communication). In various arrangements, communication circuit 210 may be configured to communicate with various components of system 100 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

Sensors 206:

Sensors 206 are formed of any suitable size, shape, design, technology, and in any arrangement configured to measure environmental conditions indicative of fire to facilitate fire detection. In some various arrangements, sensors 206 may include but are not limited to, for example, temperature sensors, smoke sensors, chemical sensors (e.g., carbon monoxide sensors) and/or any other type of sensor. In some arrangements, sensors 206 may be formed along with control circuit 202 as a single combined unit. Alternatively, in some arrangements sensors 206 and control circuit 202 may be communicatively connected by communication circuit 210.

User Interface 204:

User interface is formed of any suitable size, shape, design, technology, and in any arrangement, and is configured to facilitate user control and/or adjustment of various components of system 100. In one or more arrangements, as one example, user interface 204 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface 204 includes a display (not shown). Display is formed of any suitable size, shape, design, technology, and in any arrangement, and is configured to facilitate display information of settings, sensor readings, time elapsed, and/or other information pertaining to fire detection by system 100. In one or more arrangements, display may include, for example, LED lights, meters, gauges, screen or monitor of a computing device, tablet, and/or smartphone. Additionally or alternatively, in one or more arrangements, the inputs and/or display may be implemented on a separate device that is communicatively connected to control circuit 202. For example, in one or more arrangements, operation of control circuit 202 may customized using a smartphone or other computing device that is communicatively connected to the control circuit 202 (e.g., via Bluetooth, and/or the internet).

From the above discussion it will be appreciated that one or more arrangements presented herein improve upon the state of the art and provide a fire door system: that prevents spread of fire through an opening for a conveyor in a fire wall; that is compatible with belt-type conveyors; that closes a fire door automatically when fire is present; that monitors environmental conditions indicative of fire; that is relatively inexpensive; that has a long useful life; that is durable; that has a robust design; that is high quality; that is easy to use; that is easy to control; and/or that is easy to install. These and other objects, features, or advantages of the disclosure will become apparent from the specification, figures, and claims.

Although the present disclosure has been described with respect to certain illustrative embodiments, those skilled in the art will appreciate it is not limited to these embodiments and that changes and modifications can be made therein within the scope of the disclosure as set forth in the appended claims.

SELECTED REFERENCE NUMBERS

14—Opening
16—Wall
18—Poultry Houses (not shown)
20—Conveyor
22—Rollers
24—Belt
26—Guide Rails
28—Motor
30—Upper Portion (of Belt 24)
32—Source End
34—Destination End
36—Lower Portion (of Belt 24)
40—Upper End (of Opening 14)
42—Lower End (of Opening 14)
44—Opposing Sides (of Opening 14)
46—Upper Opening (of Opening 14)
48—Middle Opening (of Opening 14)
50—Lower Opening (of Opening 14)
100—System
102—Door Frame Assembly (of System 100)
104—Door Assembly (of System 100)
106—Actuator (of System 100)
110—Upper Section (of Cover Plate Frame)
112—Lower Section (of Cover Plate Frame)
114—Center Section (of Cover Plate Frame)
120—Top Member (of Upper Section 110)
122—Side Members (of Upper Section 110)
126—Upper Edge (of Top Member 120)
128—Lower Edge (of Top Member 120)
130—Side Edges (of Top Member 120)
134—Side Edges (of Side Members 122)
136—Bottom Edge (of Side Members 122)
140—Top Edge (of Lower Section 122)

142—Bottom Edge (of Lower Section 122)
144—Side Edges (of Lower Section 122)
150—Top Edge (of Center Section 114)
152—Bottom Edge (of Center Section 114)
154—Side Edges (of Center Section 114)
158—Fasteners
160—Door (of Door Assembly 104)
162—Door Track
164—Opening
170—Top Edge (of Door 160)
172—Bottom Edge (of Door 160)
174—Side Edges (of Door 160)
180—Front Surface (of Tracks 162)
182—Rear Surface (of Tracks 162)
184—Inner Side (of Tracks 162)
186—Outer Side (of Tracks 162)
188—Upper End (of Tracks 162)
190—Lower End (of Tracks 162)
192—Slot (of Tracks 162)
200—Control System (of System 100)
202—Control Circuit (of Control System 200)
204—User Interface (of Control System 200)
206—Sensors (of Control System 200)
210—Communication Circuit (of Control Circuit 202)
212—Processing Circuit (of Control Circuit 202)
214—Memory (of Control Circuit 202)
216—Code (of Control Circuit 202)

What is claimed:

1. A system, comprising:
a conveyor;
the conveyor having a set of rollers;
the conveyor having a belt;
wherein the belt is positioned on the set of rollers and forms a continuous loop having an upper portion of the belt and a lower portion of the belt;
wherein the conveyor extends through a first opening in a fire wall;
wherein the belt partitions the first opening into an upper opening positioned above the upper portion of the belt, a middle opening positioned between the upper portion of the belt and the lower portion of the belt, and a lower opening positioned below the lower portion of the belt;
a fire door system;
wherein the fire door system includes a door assembly;
wherein the fire door system includes a door frame assembly;
wherein the door frame assembly is connected to the fire wall, covers a lower opening, covers the middle opening, and forms a frame for the door assembly having a door opening within the upper opening of the fire wall;
wherein the door assembly is configured to move between a closed position and an open position;
wherein in the closed position the door assembly covers the door opening;
wherein in the open position the door assembly at least partially uncovers the door opening; and
wherein the fire door system includes an actuator configured to cause the door to be moved from the open position to the closed position in response to occurrence of fire.

2. The system of claim 1, wherein the actuator is configured to hold the door in the open position in absence of fire.

3. The system of claim 1, wherein the door assembly includes a door and a set of door tracks; and
wherein the door tracks operably connect the door to the door frame assembly and facilitates movement of the door between the open position and the closed position.

4. The system of claim 1, wherein the door assembly includes a gravity drop door.

5. The system of claim 1, wherein the actuator includes a fusible link.

6. The system of claim 1, wherein the actuator includes an electromagnetic latch.

7. The system of claim 1, wherein the actuator includes a solenoid driven latch.

8. The system of claim 1, wherein the actuator includes a motorized latch.

9. The system of claim 1, wherein the actuator includes a linear actuator.

10. The system of claim 1, wherein the actuator includes exploding bolts.

11. The system of claim 1, wherein the actuator includes a manual actuated lever.

12. The system of claim 1, wherein the door assembly and door frame assembly are formed of plate steel.

13. The system of claim 1, wherein one or more of the door assembly and door frame assembly are coated with an ablative material.

14. The system of claim 1, wherein one or more of the door assembly and door frame assembly are coated with an intumescent material.

15. The system of claim 1, wherein fire door system is sealed by fire rated caulking and/or fire rated sealant.

16. The system of claim 1, wherein the door frame assembly includes an upper section, a lower section, and a center section;
wherein the upper section includes a top member extending across an upper edge of the first opening in the fire wall and side members extending downward from the top member along sides of the first opening;
wherein the center section extends between the side members of the upper section and covers the middle opening; and
wherein the lower section extends between the side members of the upper section and covers the lower opening.

17. The system of claim 1, further comprising a control system;
wherein the control system includes one or more sensors and a control circuit;
wherein the one or more sensors are configured to measure one or more environmental conditions indicative of fire; and
wherein in response to measurements of the one or more sensors being indicative of fire, the control circuit is configured to cause the actuator to move the door assembly to the closed position.

18. A fire door system for a conveyor extending through an opening in a fire wall, comprising:
wherein a belt of the conveyor partitions the opening into an upper opening positioned above an upper portion of the belt, a middle opening positioned between the upper portion of the belt and a lower portion of the belt, and a lower opening positioned below the lower portion of the belt;
a door assembly;
a door frame assembly;
wherein the door frame assembly is connected to the fire wall, covers a lower opening, covers the middle opening, and forms a frame for the door assembly having a door opening within the upper opening of the fire wall;
wherein the door assembly is configured to move between a closed position and an open position;
wherein in the closed position the door assembly covers the door opening;

wherein in the open position the door assembly at least partially uncovers the door opening; and an actuator configured to cause the door to be moved from the open position to the closed position in response to occurrence of fire; and wherein the actuator is configured to hold the door in the open position in absence of fire.

19. The system of claim 18, wherein the door assembly includes a gravity drop door.

20. The system of claim 18, further comprising a control system;

wherein the control system includes one or more sensors and a control circuit;

wherein the one or more sensors are configured to measure one or more environmental conditions indicative of fire; and wherein in response to measurements of the one or more sensors being indicative of fire, the control circuit is configured to cause the actuator to move the door assembly to the closed position.

* * * * *